(12) United States Patent
Kim

(10) Patent No.: US 6,392,369 B1
(45) Date of Patent: May 21, 2002

(54) DIGITAL REALTIME CONVERGENCE CORRECTION CIRCUIT AND METHOD THEREOF

(75) Inventor: Kyoung-hwan Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/850,542

(22) Filed: May 7, 2001

(30) Foreign Application Priority Data

Dec. 20, 2000 (KR) .............................. 00-79188

(51) Int. Cl.$^7$ ................................. H01J 29/70
(52) U.S. Cl. ............. 315/367; 315/368.11; 315/368.12; 315/368.28; 348/807
(58) Field of Search .................... 315/367, 368.11, 315/368.12, 368.13, 368.18, 368.24, 368.25, 368.28, 370; 348/807, 805, 806

(56) References Cited

U.S. PATENT DOCUMENTS

| | | | | |
|---|---|---|---|---|
| 4,754,204 A | * | 6/1988 | Ando et al. .................. 315/367 |
| 4,980,614 A | * | 12/1990 | Yamada et al. .............. 315/367 |
| 5,345,280 A | * | 9/1994 | Kimura et al. .......... 315/368.12 |
| 5,497,054 A | * | 3/1996 | Ryu ....................... 315/368.11 |
| 6,288,758 B1 | * | 9/2001 | Chujo ................... 315/368.11 |

\* cited by examiner

*Primary Examiner*—Don Wong
*Assistant Examiner*—Thuy Vinh Tran
(74) *Attorney, Agent, or Firm*—F. Chau & Associates, LLP

(57) ABSTRACT

A convergence correction circuit including a coordinate unit which sets a predetermined range with first level values according to a screen length; an interval unit which divides the screen length; an interval decoder which calculates the value of the branch point of each interval determined by the interval unit; an interval gain unit which stores the gain of each interval; a subtracter which subtracts the output of the coordinate unit from the output of the interval decoder; a multiplier which multiplies the output of the subtracter by the output of the interval gain unit; a level shifter which sets an initial and last value of each interval upon horizontal scanning; an adder which adds the output of the multiplier and the output of the level shifter; a digital-analog converter which converts the output of the adder; and a correction coil which corrects the convergence according to the converted output.

10 Claims, 3 Drawing Sheets

DIGITAL REALTIME CONVERGENCE CORRECTION CIRCUIT AND METHOD THEREOF

BACKGROUND OF THE INVENTION

1. Field of the Invention

The present invention relates to integrated circuits, and more particularly, to a digital, realtime convergence correction circuit and a method thereof.

2. Discussion of Related Art

Convergence correction for color televisions and computer monitors has heretofore been performed largely in analog, using a correction signal generated from the horizontal and vertical deflection signals.

As the television or monitor screen size gets larger, the distance between the projector and the screen increases. Thus, the image becomes diffuse. Further, the screen surface of a 3-tube type color television set becomes rough, and the allowable range of misconvergence becomes narrow. Therefore, a convergence correction apparatus is needed. Accordingly, for conventional projector-type color television sets, in which the convergence is corrected in an analog process, a plurality of control means may be needed in order to correct the convergence of various configurations.

For example, if the shape of the projection screen of a 3-tube type project-type color television set changes, that is, the aspect ratio changes, the characteristics of the convergence changes accordingly. Therefore, readjustment of the convergence may be needed. Also, in the case of correcting the convergence in an analog process, in order to cope with various aspect ratios, it has been proposed to use a separate set of manual controls. However, if such proposal is adapted, additional control means for the convergence correction may be needed with respect to various screen sizes.

One proposal for correcting the convergence in a digital process is described in the U.S. Pat. No. 4,754,204. FIG. 1, of the '204 patent shows data needed in the convergence correction being stored in a field memory 1 and the data being read by an address encoder 2. The data output from the field memory 1 is converted into an analog signal through a digital-analog converter 8 and provided to a drive amplifier 9. The output of the drive amplifier 9 is provided to a correction coil 10 and corrects the convergence. However, since the system of the '204 patent needs a field memory 1 for storing data corresponding to a field, the degree of integration is lowered. Also, the prior art system may not be capable of handling the changes in the frequency of a system clock, in the size of a screen, or in distance between the projector and screen.

Therefore, a convergence correction circuit which digitally corrects the convergence in realtime and can cope with different configurations is needed.

SUMMARY OF THE INVENTION

To solve the above problems, it is an object of the present invention to provide a digital, realtime convergence correction circuit. It is another object of the present invention to provide a correction method for the convergence circuit.

To accomplish the above objects, a convergence correction circuit is provided, including a coordinate generating unit which sets a predetermined range with first level values in response to the length of a screen. The convergence correction circuit further includes an interval determining unit which divides the length of the screen in a predetermined number of intervals, and an interval decoder for calculating a value of a branch point of each interval determined by the interval determining unit. The convergence correction circuit includes an interval gain adjusting unit for storing the gain of each interval, a subtracter for subtracting the output of the coordinate generating unit from the output of the interval decoder, and a multiplier for multiplying the output of the subtracter by the output of the interval gain adjusting unit. The convergence correction circuit also includes a level shifter which sets an initial value and a last value of each interval when a horizontal scanning starts, and an adder which adds the output of the multiplier and the output of the level shifter. Further still, the convergence correction circuit includes and a digital-analog converter which converts the output of the adder into an analog value, and a correction coil which corrects the screen convergence with respect to the value output from the digital-analog converter.

Preferably, the length of the screen is a cycle of a horizontal synchronization signal or a vertical synchronization signal, and the coordinate generating unit changes the first level values with respect to the size of the screen. The interval determining unit divides the screen into a predetermined number of parts, and the interval decoder sets the value of the branch point of each interval so that the value of the branch point of each interval is the same as the first level value in the branch point. The interval gain adjusting unit receives the gain of each interval provided from the outside, and the gain of each interval has an arbitrary value for each neighboring interval.

To accomplish an object of the present invention, there is also provided a convergence correction method. The method (a) sets a predetermined range formed of the first level values for a cycle of a horizontal synchronization signal and a vertical synchronization signal, and (b) divides a cycle of the horizontal synchronization signal and vertical synchronization signal in a predetermined number of intervals. The method further (c) sets a value of a branch point of each interval so that the value of the branch point of each interval is the same as the first level value at the branch point, (d) storing the gain of each interval, (e) subtracting the value of the branch point of each interval of the step (C) from the first level range of the step (a), (f) multiplying the output of the step (e) by the gain of each interval in the step (d), (g) converting the output of the step (f) into an analog value, and (h) correcting the convergence of the screen with respect to the output value of the step (g).

Preferably, according to the convergence correction method, after the step (f), further has the steps of (i) setting an initial level value when horizontal/vertical synchronization starts, and (ii) storing the output of the step (f) at the branch point of each interval, and adding the stored output to the output of the step (f) at other point which is not branch point.

According to the present invention, since the convergence can be digitally corrected in realtime, and the coordinates range can be varied with respect to the size of a screen, the convergence can be stably corrected, regardless of the size of a screen, and even for changes in screen position. Also, since a slope for setting the value of a first level can change with respect to changes in horizontal/vertical synchronization signal, the system and method can cope with changes in the frequency of an input horizontal/vertical synchronization signal.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF PREFERRED EMBODIMENTS

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art. The same reference numbers refer to the same respective elements throughout the drawings.

Figure 1:
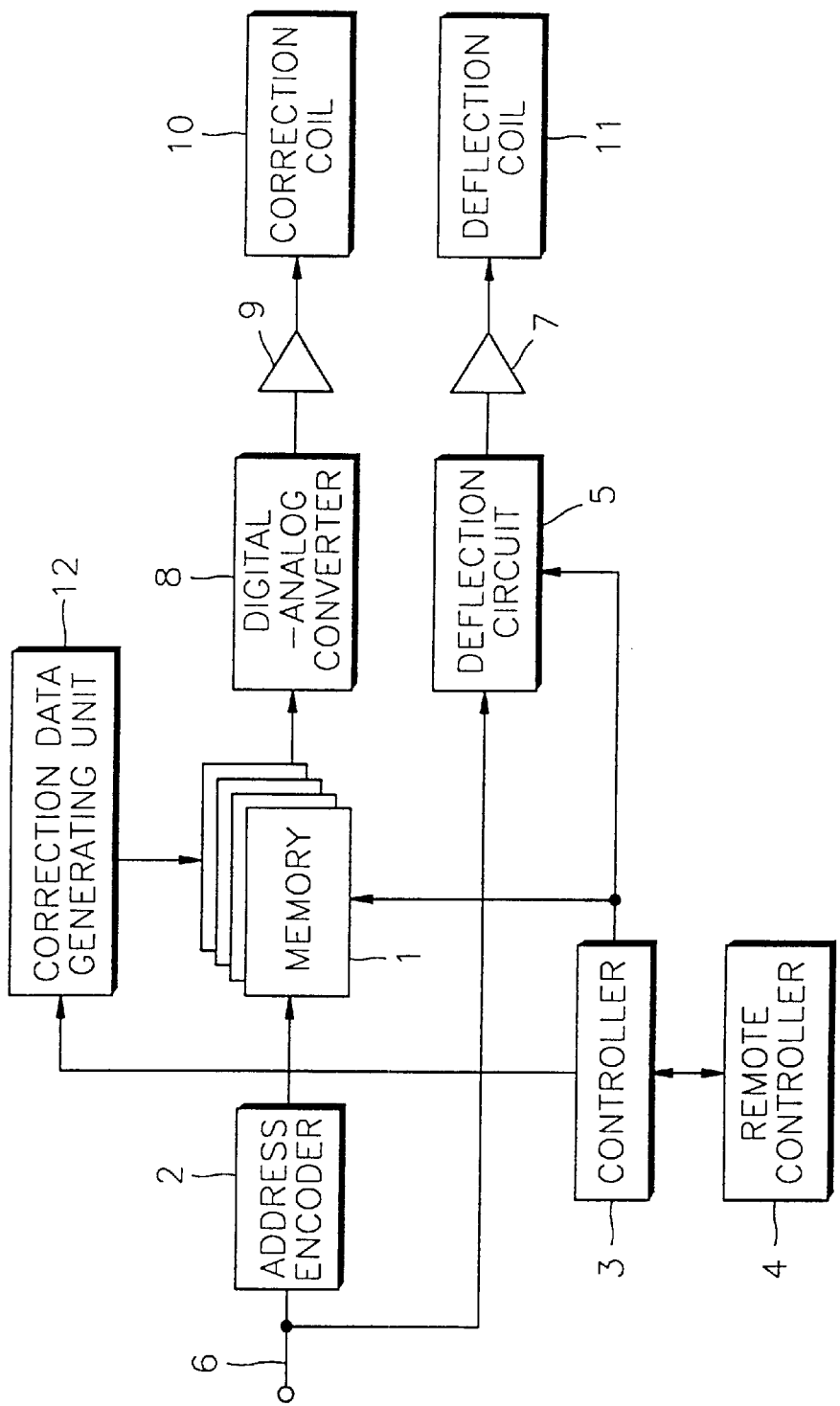
FIG. 1 is the conventional correction circuit shown in U.S. Pat. No. 4,754,204.
Figure 2:
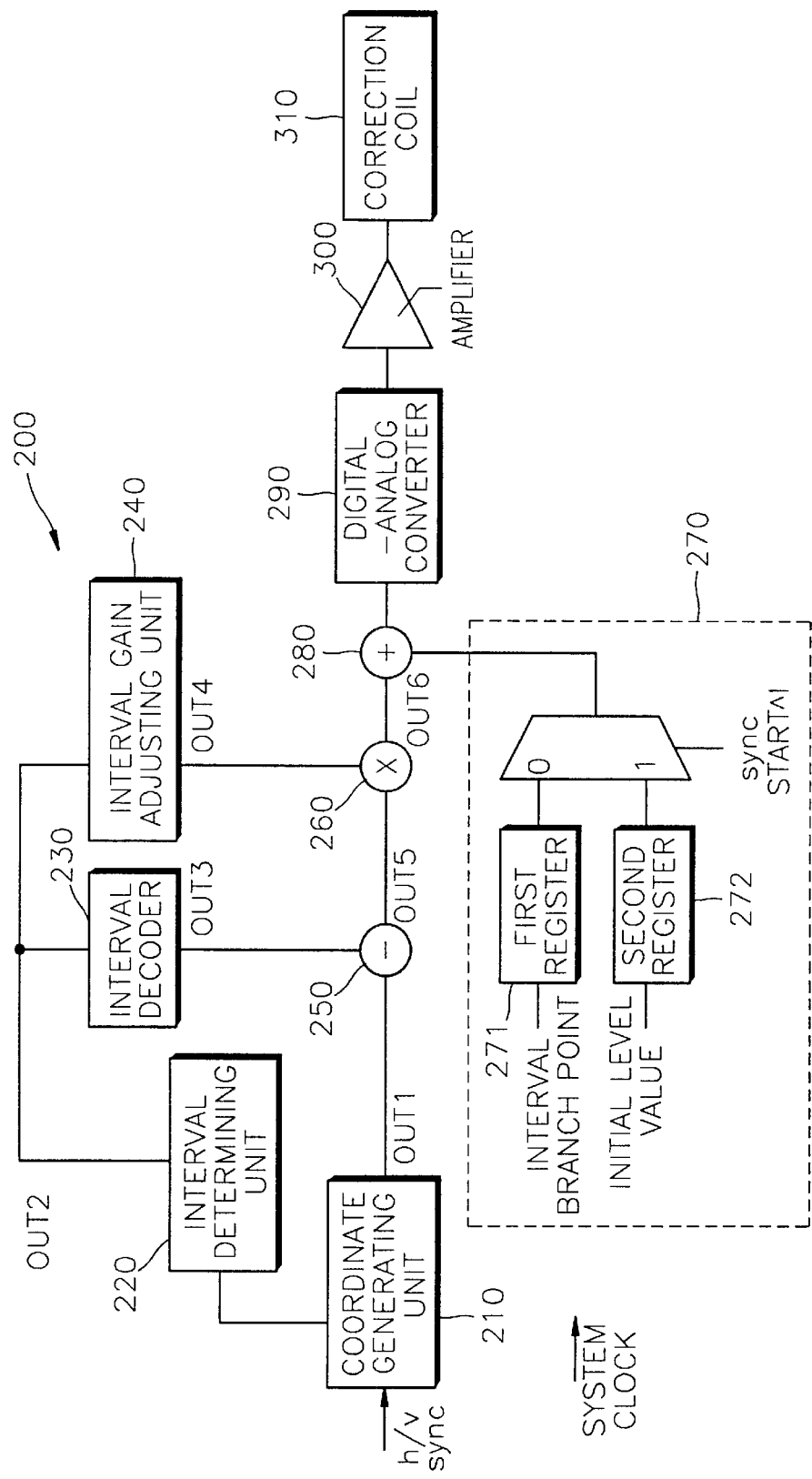
FIG. 2 is a convergence correction circuit according to an embodiment of the present invention.
Figure 3:
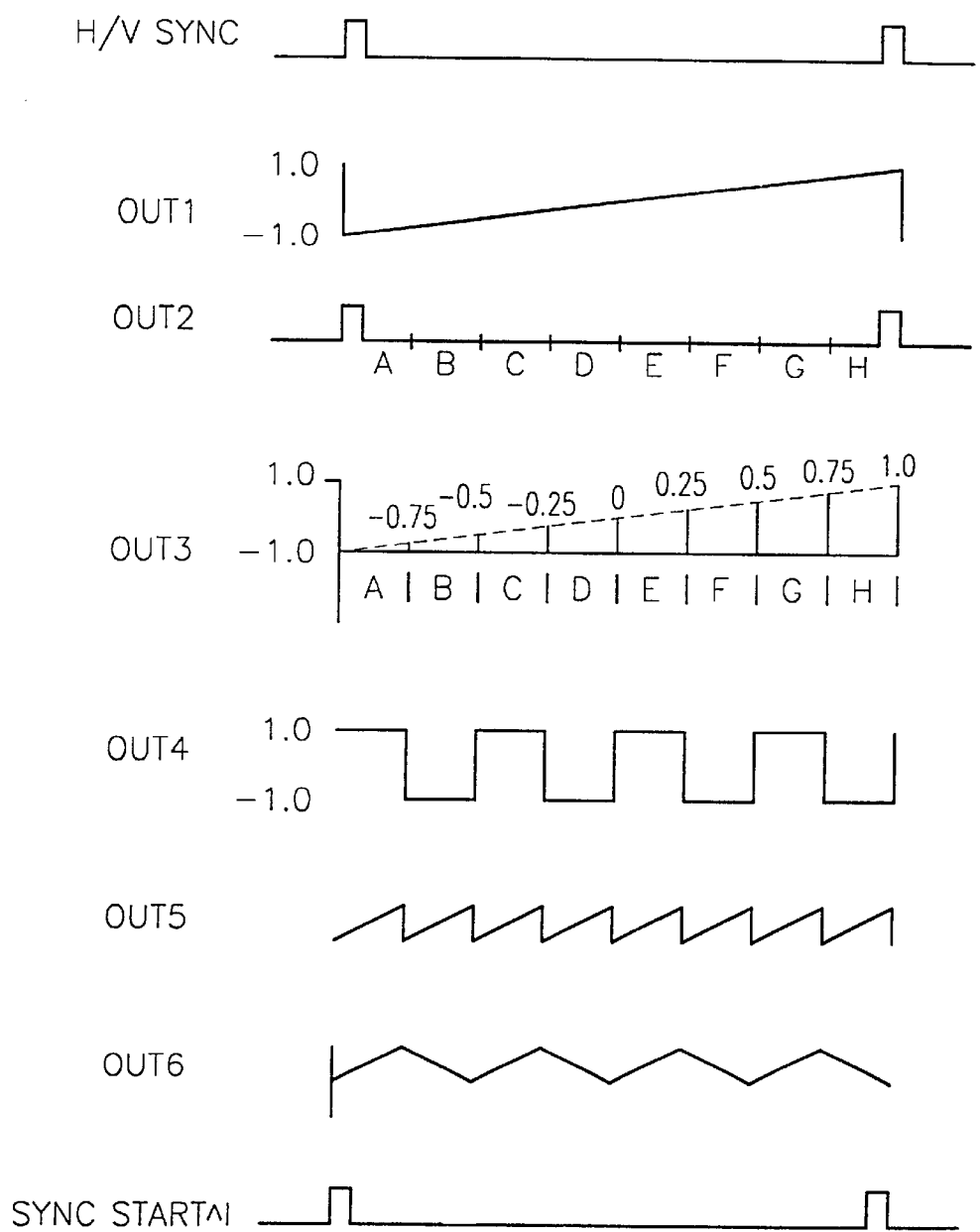
FIG. 3 is the waveform of the operation of the convergence correction circuit of FIG. 2.

FIG. 2 illustrates a convergence correction circuit 200 according to an embodiment of the present invention. The convergence correction circuit 200 has a coordinate generating unit 210, an interval determining unit 220, an interval decoder 230, an interval gain adjusting unit 240, a subtracter 250, a multiplier 260, a level shifter 270, an adder 280, a digital-analog converter 290, an amplifier 300, and a correction coil 310. FIG. 3 is a waveform for explaining the operation of the convergence correction circuit 200 according to an embodiment of the present invention, and will now be explained with the elements of FIG. 2.

The coordinate generating unit 210 is set to have an arbitrary value during a cycle of a horizontal synchronization signal and a vertical synchronization signal. The horizontal synchronization signal and vertical synchronization signal (H/V SYNC) represent the horizontal length and vertical length, respectively, of a screen (image). For example, when the coordinate generating unit 210 sets the cycle of a horizontal synchronization signal (H SYNC) to a value between '−1' and '1', the output of the coordinate generating unit 210 is depicted as OUT1 in FIG. 3. For larger screen sizes (zoomed in images), for example, if the size of a given image is 1.5 times larger than another image, the range for the H SYNC can be between '−1.5' and '1.5'. For a reduced screen (image), for example, if the size of a given screen (image) is reduced (zoomed out) by 0.5 times as compared to another screen (image), the range for the H SYNC can be between '−0.5' and '0.5'.

The coordinate generating unit 210 outputs a cycle of the horizontal synchronization signal and vertical synchronization signal (H/V SYNC), by generating coordinates from −N to +N. Here, N is 1.0 for a screen (image) of a given size, and is 1.0×M for the screen enlarged (zoomed in) by M times.

The interval determining unit 220 divides a cycle of the horizontal synchronization signal and vertical synchronization signal (H/V SYNC) in predetermined equal portions. For example, the interval determining unit 220 may divide a cycle into 8 equal portions, and distinguish the portions into interval A, interval B, interval C, . . . , interval H. The output of the interval determining unit 220 is depicted as OUT2, shown in FIG. 3. It should be noted that the number of divided portions can be varied according to variations in the final output.

By way of an example, for a cycle of the horizontal synchronization signal and vertical synchronization signal (H/V SYNC) divided into 8 equal portions, the interval decoder 230 calculates a value for the branch point of each interval (A, B, C, . . . , H), and the value of the branch point of each interval (A, B, C, . . . , H) is '−1'1, '0', '−0.75', '−0.5', '−0.25', '0', '0.25', '0.5', '0.75', and '1.0', respectively. The output of the interval decoder 230 is depicted as OUT3, shown in FIG. 3.

The interval gain adjusting unit 240 stores the gain of each interval (A, B, C, . . . , H) provided from the outside, for example, stores each interval (A, B, C, . . . , H) stores '1.0', '−1.0', '1.0', '−1.0', '1.0', '−1.0', '1.0', and '−1.0', respectively. The output of the interval gain adjusting unit 240 is depicted as OUT4, shown in FIG. 3.

The subtracter 250 subtracts the output (OUT3) of the interval decoder 230 from the output (OUT1) of the coordinate generating unit 210, and as the result, generates a sawtooth waveform, in which the branch point of each interval (A, B, C, . . . , H) is '0', depicted as (OUT5) in FIG. 3.

The multiplier 260 multiplies the output (OUT5) of the subtracter 250 by the output (OUT4) of the interval gain adjusting unit 240. For example, OUT6 as depicted in FIG. 3, a triangle waveform is generated.

The adder 280 adds the output (OUT6) of the multiplier 260 to the output of the level shifter 270. The level shifter 270 is formed of a first register 271 for storing an interval ending time, and a second register 272 for storing an initial level value. The level shifter 270 controls the first register 271 and the second register 272. The second register 272 outputs the initial level value when starting horizontal synchronization (H SYNC), and otherwise makes the first register 271 output the interval ending time. The output of the adder 280 is converted into an analog value through the digital-analog converter 290, and the output of the digital-analog converter 290 is amplified by the amplifier 300. The output of the amplifier 300 is provided to the correction coil 310 to correct the convergence.

Therefore, since the convergence correction circuit 200 of the present invention divides a screen and corrects the convergence of divisions, the convergence correction circuit 200 digitally operates in realtime. Also, since the predetermined range of the coordinate generating unit 210 can be varied with respect to the size of a screen, the convergence can be corrected regardless of the size of a screen. Since the changes in screen positions can be processed in the same way as the screen size, the convergence can be stably corrected for changes in screen positions. It is readily apparent to one skilled in the art that the term "screen" used herein can be interchanged with "image" and the invention is applicable to either screen and/or image.

When the cycle of the input horizontal/vertical synchronization (H/V SYNC) changes, the coordinate generating unit 210 generates coordinates from −N to +N, and changes in the synchronization cycle can be automatically processed.

So far, the present invention is explained referring to the embodiment shown in the drawings, but this is only to explain the present invention. Therefore, the present invention is not restricted to the above-described embodiments and many variations are possible within the spirit and scope of the present invention. The scope of the present invention is not determined by the description but by the accompanying claims.

What is claimed is:

1. A convergence correction device comprising:
   a coordinate generating unit for setting a predetermined range with first level values in response to the length of a screen;
   an interval determining unit for dividing the length of the screen in a predetermined number of intervals;

an interval decoder for calculating a value of a branch point of each interval;

an interval gain adjusting unit for storing the gain of each interval;

a subtracter for subtracting the output of the coordinate generating unit from the output of the interval decoder;

a multiplier for multiplying the output of the subtracter by the output of the interval gain adjusting unit;

a level shifter for setting an initial value and a last value of each interval when a horizontal scanning starts;

an adder for adding the output of the multiplier and the output of the level shifter;

a digital-analog converter for converting the output of the adder into an analog value; and a correction coil for correcting the screen convergence with respect to the analog value output from the digital-analog converter.

2. The convergence correction device of claim 1, wherein the length of the screen is a cycle of a horizontal synchronization signal.

3. The convergence correction device of claim 1, wherein the length of the screen is a cycle of a vertical synchronization signal.

4. The convergence correction device of claim 1 wherein the coordinate generating unit changes the first level values with respect to the size of the screen.

5. The convergence correction device of claim 1, wherein the interval decoder sets the value of the branch point of each interval so that the value of the branch point of each interval is the same as the first level value in the branch point.

6. The convergence correction device of claim 1, wherein the interval gain adjusting unit receives the gain of each interval provided from the outside.

7. The convergence correction device of claim 1, wherein the subtracter generates a sawtooth waveform, in which the branch point of each interval is '0'.

8. The convergence correction device of claim 1, wherein the level shifter comprises:

a first register for storing the ending time of an interval displayed on the screen; and a second register for storing the initial level value.

9. A convergence correction method comprising the steps of:

(a) setting a predetermined range formed of the first level values for a cycle of a horizontal synchronization signal and a vertical synchronization signal;

(b) dividing a cycle of the horizontal synchronization signal and vertical synchronization signal in a predetermined number of intervals;

(c) setting a value of a branch point of each interval so that the value of the branch point of each interval is the same as the first level value at the branch point;

(d) storing the gain of each interval;

(e) subtracting the value of the branch point of each interval of the step (C) from the first level range of the step (a);

(f) multiplying the output of the step (e) by the gain of each interval in the step (d);

(g) converting the output of the step (f) into an analog value; and (h) correcting the convergence of the screen with respect to the output value of the step (g).

10. The convergence correction method of claim 9, after the step (f) further comprising the steps of:

(i) setting an initial level value when horizontal/vertical synchronization starts; and (ii) storing the output of the step (f) at the branch point of each interval, and adding the stored output to the output of the step (f) at other point which is not branch point.

* * * * *